(12) United States Patent
van Klooster et al.

(10) Patent No.: US 10,584,995 B2
(45) Date of Patent: Mar. 10, 2020

(54) ULTRASOUND FLOWMETER AND METHOD FOR MEASURING FLOW RATE

(71) Applicant: KROHNE AG, Basel (CH)

(72) Inventors: Jeroen Martin van Klooster, Tiel (NL); Arie Huijzer, Sliedrecht (NL)

(73) Assignee: KROHNE AG, Basel (CH)

( * ) Notice: Subject to any disclaimer, the term of this patent is extended or adjusted under 35 U.S.C. 154(b) by 313 days.

(21) Appl. No.: 15/848,189

(22) Filed: Dec. 20, 2017

(65) Prior Publication Data

US 2018/0180461 A1 Jun. 28, 2018

(30) Foreign Application Priority Data

Dec. 27, 2016 (DE) .......................... 10 2016 125 745

(51) Int. Cl.
| | |
|---|---|
| *G01F 25/00* | (2006.01) |
| *G01F 1/66* | (2006.01) |
| *G01F 5/00* | (2006.01) |
| *G01P 5/24* | (2006.01) |

(52) U.S. Cl.
CPC .......... *G01F 25/0007* (2013.01); *G01F 1/662* (2013.01); *G01F 1/667* (2013.01); *G01F 5/005* (2013.01); *G01P 5/241* (2013.01)

(58) Field of Classification Search
CPC ....... G01F 25/0007; G01F 1/662; G01F 1/667
USPC .................................................... 73/861.18
See application file for complete search history.

(56) References Cited

U.S. PATENT DOCUMENTS

| | | | |
|---|---|---|---|
| 5,372,047 A | 12/1994 | Russwurm et al. | |
| 5,546,812 A | 8/1996 | Drenthen | |
| 7,571,656 B2 | 8/2009 | Derevyagin et al. | |
| 7,810,399 B2* | 10/2010 | van Klooster | G01F 1/667 |
| | | | 73/861.31 |
| 8,794,080 B2 | 8/2014 | Mueller et al. | |
| 9,453,749 B1 | 9/2016 | Bachmann et al. | |
| 2018/0328768 A1* | 11/2018 | Huijzer | G01F 1/662 |
| 2019/0063970 A1* | 2/2019 | Deng | G01H 11/08 |

FOREIGN PATENT DOCUMENTS

WO 92/00507 A1 1/1992

* cited by examiner

*Primary Examiner* — Jamel E Williams
(74) *Attorney, Agent, or Firm* — David S. Safran; Roberts Mlotkowski Safran Cole & Calderon, P.C.

(57) ABSTRACT

An Ultrasonic flowmeter for measuring the flow of a medium through a measuring tube (3) with at least two ultrasonic transducers (4,5) and at least one control and evaluation unit (6). The measuring tube (3) has an inner wall, the ultrasonic transducers (4, 5) are transmitters (4,5) for transmitting an ultrasonic signal (7) and/or are receivers (4, 5) for receiving the ultrasonic signal, and are arranged offset in the direction of flow such that the respective transmitter (4, 5) transmits an ultrasonic signal (7) in the direction of flow or against the direction of flow during operation. The receiver (4, 5) receives the ultrasonic signal (7) transmitted by the transmitter (4, 5) after at least one reflection on the inner wall of the measuring tube (3), the ultrasonic signal (7) having a first signal component (8) and at least a second signal component (9).

14 Claims, 8 Drawing Sheets

ULTRASOUND FLOWMETER AND METHOD FOR MEASURING FLOW RATE

BACKGROUND OF THE INVENTION

Field of the Invention

The invention is based on an ultrasonic flowmeter for measuring the flow rate of a medium flowing through a measuring tube with at least two ultrasonic transducers and at least one control and evaluation unit, wherein the measuring tube has an inner wall, wherein the ultrasonic transducers each are designed as transmitters for transmitting an ultrasonic signal and/or as receivers for receiving the ultrasonic signal, wherein the ultrasonic transducers are arranged offset in the direction of flow such that the respective transmitter transmits an ultrasonic signal in the direction of flow or against the direction of flow during operation and that the receiver receives the ultrasonic signal transmitted by the transmitter after at least one reflection on the inner wall of the measuring tube, wherein the ultrasonic signal has a first signal component and at least a second signal component.

Furthermore, the invention is based on a method for measuring the flow rate of a medium flowing through a measuring tube by means of an ultrasonic flowmeter, wherein the ultrasonic flowmeter has at least two ultrasonic transducers and at least one control and evaluation unit, wherein the measuring tube has an inner wall, wherein the ultrasonic transducers are each designed as a transmitter for transmitting an ultrasonic signal and/or as a receiver for receiving the ultrasonic signal, wherein the ultrasonic transducers are arranged on the measuring tube offset in the direction of flow such that the respective transmitter transmits an ultrasonic signal in the flow direction or against the flow direction and in that the receiver receives the ultrasonic signal transmitted by the transmitter after at least one reflection on the inner wall of the measuring tube, wherein the ultrasonic signal has a first signal component and at least a second signal component.

Description of Related Art

The measurement of the flow and the speed of a medium flowing through a measuring tube is known from the prior art. An ultrasonic flowmeter usually has at least two ultrasonic transducers, each of which is designed as a transmitter and receiver and which are arranged offset along the measuring tube such that in one configuration the transmitter transmits an ultrasonic signal in the direction of flow, wherein the ultrasonic signal is received by the receiver after that ultrasonic signal has passed through the medium, and that in a second configuration, the transmitter, which previously served as a receiver, transmits an ultrasonic signal along the same measurement path against the flow direction, wherein the ultrasonic signal is received by the second ultrasonic transducer now operating as a receiver. Due to the entrainment effect, the two ultrasonic signals described above reach the respective receiver after different transit times. The flow rate of the medium can be determined from the transit time difference of the signals. The flow rate of the medium determines the volume flow.

When determining the volume flow, the flow profile of the flowing medium is also to be taken into account. The flow profile of the medium is dependent in particular on the Reynolds number.

The error in the determination of the flow rate depends on the position and the number of points in the flow profile at which the speed of the medium is measured. If the speed of the medium is determined with a single-beam flowmeter, wherein the ultrasonic signal passes through the center of the measuring tube on a v-shaped or simple measuring path and intersects the measuring tube axis with r=0 R, wherein R is the radius of the measuring tube, then the measuring deviation between a turbulent and a laminar flow profile is particularly high.

It is therefore known to measure the flow profile at several points to determine the flow rate of a medium in order to minimize the error described above. A two-beam ultrasonic flowmeter, wherein each of a transmitter and receiver pair are arranged in the area adjacent to the center of the measuring tube, wherein the ultrasonic signals extend in parallel planes that do not cross the measuring tube axis, has a much lower measurement deviation. In addition, ultrasonic flow meters are known that have five plane-parallel measuring paths, wherein five transmitter and receiver pairs, that is to say ten ultrasonic transducers, are arranged along the measuring tube circumference. Each measuring path is defined by the shortest vertical distance to the measuring tube axis. For example, the ultrasonic transducers measure the flow profile at five measuring paths which intersect the measuring tube axis at r=0 R or the regions at r=0.5 R and at r=0.8 R twice each. According to this design, it is possible to detect the flow profile so finely that the influences of the flow profile can be largely compensated in determining the flow rate. However, a disadvantage of this design is that such an ultrasonic flowmeter is very expensive due to the use of ten ultrasonic transducers.

European Patent EP 0 639 776 B1 and corresponding U.S. Pat. No. 5,546,812 also disclose a configuration of an ultrasonic flowmeter in which the ultrasonic signal passes through acoustic paths having different degrees of sensitivity to eddying of the medium, wherein the acoustic paths have at least two reflections against the inner wall of the measuring tube. In contrast to the previously described designs, the acoustic paths do not run in one plane. The ultrasonic signals traverse a large part of the measuring tube cross-section and thus provide a reliable picture of the flow.

Finally, it is known from the prior art of German Patent Application DE 40 10 148 A1 and corresponding U.S. Pat. No. 5,372,047 that when the ultrasonic signal is reflected at least once on the inner wall of the measuring tube, in addition to the relevant wanted signal, interference signals with attenuated intensity, which are arranged in the edge region of the ultrasonic cone, reach the receiver via a second measuring path. The wanted signal and the interference signal have different transit times. In order to attenuate the interference signal, the arrangement disclosed in these patents has a defocusing measure at the reflection location of the parasitic radiation, in particular in the form of a convex reflector.

SUMMARY OF THE INVENTION

Based on this prior art, it is an object of the invention to provide an ultrasonic flowmeter, with which the flow of the medium can be reliably determined independently of the flow profile and which is also inexpensive. In addition, an object of the invention is to provide a simple and inexpensive method for determining the flow rate of a flowing medium through a measuring tube regardless of the flow profile.

According to a first teaching of the present invention, the previously derived and illustrated object is achieved by an ultrasonic flowmeter mentioned in the introduction in that the ultrasonic transducers are aligned with one another so that the first signal component of the ultrasonic signal passes via a first measuring path from the transmitter to the receiver and that second signal component of the ultrasonic signal passes via a second measuring path from the transmitter to the receiver, wherein the first measuring path and the second measuring path have a different number of reflections on the inner wall of the measuring tube and wherein the first signal component and the second signal component are distinguishable by different transit times at the receiver and that the control and evaluation unit is designed such that the control and evaluation unit determines the speed and the flow rate of the medium using the transit time of the first signal component and the transit time of the second signal component.

According to the invention, it has been recognized that the different signal components of an ultrasonic signal transmitted by the transmitter can be used in order to implement different stable measuring paths within the measuring tube, which can be used to determine the speed and the flow rate of the flowing medium. In this case, a signal component passes through a stable measuring path if and only if the signal component is received by the receiver and a signal is generated at the receiver, which is above the noise floor.

Due to the different angles with which the signal components are radiated into the measuring tube during operation, the signal components or the measuring paths of the ultrasonic measuring device pass through different regions of the flow profile. As a result, the ultrasonic flowmeter according to the invention, thus, has the advantage that a large number of measuring paths is provided with a particularly small number of ultrasonic transducers, wherein the flow profile can be measured particularly finely over the measuring paths. For example, at least two different measuring paths can be implemented with an arrangement of two ultrasonic transducers.

In one design, the frequency of the ultrasonic signal emitted by the transmitter is approximately 2 MHz.

According to an advantageous design, the measuring tube has an inner cross section with a radius R and the first and second ultrasonic transducers are arranged and aligned such that the first measuring path and the second measuring path, preferably exclusively, are arranged in the edge region of the inner cross section, preferably in an area at a radius $r \geq 0.5$ R. This has the advantage that the edge region of the flow, in which the measurement deviation between a laminar and a turbulent flow profile is particularly small, is taken into account in the determination of the flow rate.

According to a further design, the first measuring path intersects the region of the flow profile at a radius $r=0.5$ R at least once, preferably twice, particularly preferably three times. The second measuring path intersects the region of the flow profile at a radius $r=0.8$ R at least once, preferably twice or three times or four times or five times.

According to a further design, the first and second measuring paths are subdivided into individual measuring path sections, wherein each measuring path section lies either between two reflections or between a reflection and an ultrasonic transducer. Particularly preferably, each measuring path section of the first measuring path intersects the flow profile at a radius $r=0.5$ R and each measuring path section of the second measuring path intersects the flow profile at a radius $r=0.8$ R.

It is also preferred when the first measuring path has three measuring path sections and when the second measuring path has five measuring path sections.

According to a further preferred design, the ultrasonic transducers are arranged and aligned such that the first measuring path has at least two reflections, in particular exactly two reflections, on the inner wall of the measuring tube and that the second measuring path has at least three, preferably at least four reflections and in particular exactly four reflections on the inner wall.

According to a further design, the ultrasonic transducers are aligned and arranged such that three stable measuring paths are present, wherein the first measuring path has two reflections on the inner wall, the second measuring path has four reflections on the inner wall and the third measuring path has three reflections on the inner wall. According to this design, it is possible that the transit times of the individual signal components, which reach the receiver via the different measurement paths, do not differ in such a way that the signals assigned to the signal components can be distinguished at the receiver.

According to a further advantageous design, at least one further signal component, which reaches the receiver via a further stable measuring path, and at least one means for suppressing the at least one further signal component of the ultrasonic signal are present. This design has the advantage that parasitic signal components which cause an error in the determination of the transit time of the remaining signal components can be selectively suppressed. The signal components used to determine the speed of the medium can be separated, according to this design, particularly easily at the receiver or, respectivley by the evaluation unit.

For example, if the ultrasonic transducers are aligned such that there are three stable measurement paths intersecting the regions of the flow profile at $r=0.5$ R, at $r=0.7$ R and at $r=0.8$ R, then the means for suppression of at least one signal component is arranged such that the measuring path or the signal component that intersects the region at $r=0.7$ R is suppressed.

In a further design, the means for suppression is designed as at least one recess of the inner wall of the measuring tube.

According to a further design, the recess is filled with a material that absorbs the ultrasonic signal.

Alternatively, or additionally, according to another design, the recess is filled with a material having a structured surface for scattering the signal component to be suppressed.

The ultrasonic transducers are preferably aligned and arranged such that the signal component to be suppressed, preferably directly, is directed into the recess, whereby this signal component is prevented from reaching the receiver. If it is said that the signal component to be suppressed is deflected directly into the recess, this means that the signal component to be suppressed is not previously reflected on the inner wall of the measuring tube.

If the ultrasonic transducers are designed such that they can work both as transmitters and as receivers, two recesses are preferably present, wherein the recesses are each arranged in the measuring tube such that the signal component to be suppressed is directed by each transmitter directly into a recess.

According to a further embodiment, the recess is designed as a hole, wherein the hole is closed to the outer wall of the measuring tube by means of a seal. In this manner, leakage of the medium can be avoided. For example, the seal may be attached by welding or comprise an elastomer. If the signal component to be suppressed is fed into the hole, this signal component is advantageously removed entirely from the interior of the measuring tube.

Particularly preferably, the recess is already provided during the production of the measuring tube, for example by injection molding.

If the recess is filled with a material which has a structural surface, then the signal component to be suppressed is diffusely scattered on the surface. As a result, the parasitic signal component to be suppressed is also prevented from reaching the receiver or it is attenuated at least so far that the corresponding signal at the receiver can no longer be distinguished from the noise. In addition, the design in which the recess is equipped with a material that absorbs the ultrasonic signal and/or a material having a structural surface for scattering the measurement path to be suppressed has the advantage that the influence on the flowing medium is minimal and, in particular, the emergence of vortices can be largely avoided.

According to a further particularly advantageous design, the ultrasonic transducer designed as a transmitter is aligned such that the ultrasonic signal is deflected in the direction of the signal component that reaches the receiver via the measuring path with the highest number of reflections, so that preferably the acoustic energy of this signal component is higher than is the acoustic energy of the other signal component or the other signal components. According to this design, the attenuation of the signal component, which reaches the receiver on the measuring path with the most reflections and thus also on the longest measuring path, can be compensated.

Particularly preferably, the ultrasonic transducer designed as a transmitter is aligned such that the first signal component and the second signal component have substantially the same acoustic energy at the ultrasonic transducer designed as a receiver.

According to a further preferred design, at least a third and a fourth ultrasonic transducer are present, which are configured in each case as transmitters and/or as receivers, wherein the third and the fourth ultrasonic transducers are arranged offset in the flow direction on the measuring tube such that the measuring path between the third and the fourth ultrasonic transducer intersects the measuring tube axis at r=0 R. The measuring path between the third and the fourth ultrasonic transducer can either simply pass through the measuring tube or, alternatively, be designed in the form of a V. This design has the advantage that, in determining the velocity of the medium, both the middle region of the flow profile and the edge region of the flow profile are taken into account. Due to the particularly fine scanning of the flow profile, the error in the determination of the speed is particularly small.

According to a particularly advantageous design, all ultrasonic transducers are arranged on the same side of the measuring tube. This has the advantage that the electronics for controlling the ultrasonic transducers and for evaluating the measured signals can be connected particularly easily using particularly short connections to the ultrasonic transducers.

During operation, the ultrasonic flowmeter preferably performs one of the methods described below.

According to a second teaching of the present invention, the object stated at the outset is achieved by a method mentioned at the outset such that the first signal component of the ultrasonic signal reaches the receiver via a first measuring path from the transmitter and that the second signal component of the ultrasonic signal passes from the transmitter to the receiver via a second measuring path, wherein the first measuring path and the second measuring path have a different number of reflections on the inner wall of the measuring tube and wherein the first signal component and the second signal component can be distinguished by different transit times at the receiver. Furthermore, it is provided that the control and evaluation unit determines the speed and the flow rate of the medium from the transit time of the first signal component and from the transit time of the second signal component.

This method has, as already stated, the advantage that in using different signal components of an ultrasonic signal such that the signal components scan different measurement paths and thus different areas of the flow profile, the determination of the speed and flow rate can be carried out particularly reliably and at the same time particularly simply and inexpensively.

Preferably, the ultrasonic flowmeter is implemented according to one of the previously described designs.

According to a next implementation of the method, at least one further signal component, which reaches the receiver via a further stable measuring path, is present, wherein the at least one further signal component of the ultrasonic signal is suppressed by a means for suppression.

In addition, it is advantageous when at least a third and a fourth ultrasonic transducer are present, which are configured, in each case, as transmitters and/or as receivers, wherein the third and the fourth ultrasonic transducers are arranged offset in the flow direction on the measuring tube such that the measuring path between the third ultrasonic transducer and the fourth ultrasonic transducer intersects the central axis at r=0 R. The third or fourth ultrasonic transducer designed as a transmitter transmits an ultrasonic signal, which is received by the third or fourth ultrasonic transducer designed as a receiver, wherein the evaluation unit takes into account the transit time of the signal in the determination of the speed.

The measuring path between the third and the fourth ultrasonic transducer can either simply pass through the measuring tube or, alternatively, be designed in the form of a V.

In detail, there is a plurality of possibilities for designing and developing the ultrasonic flowmeter according to the invention and the method according to the invention as will become apparent from the following description of preferred embodiments in conjunction with the accompanying drawings.

DETAILED DESCRIPTION OF THE INVENTION

Figure 1:
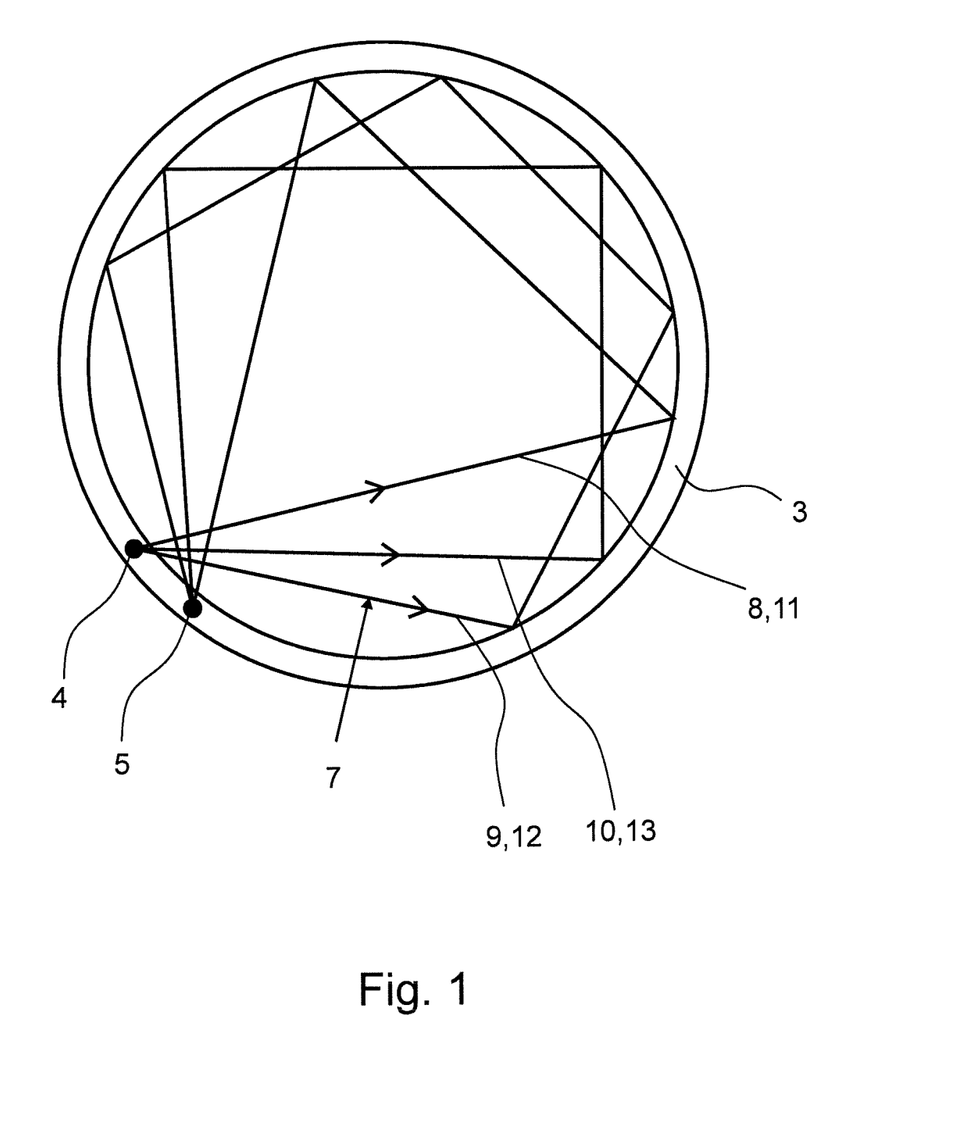
FIG. 1 is a schematic representation of the course of the measuring paths of a first embodiment of the ultrasonic flowmeter according to the invention.

FIG. 1 shows a schematic representation of the course of different measuring paths 11, 12, 13 of a first embodiment of the ultrasonic flowmeter 1 according to the invention for measuring the flow rate of a medium flowing through a measuring tube 3. In this case, two ultrasonic transducers 4, 5 are present and a control and evaluation unit 6, not shown here, that is connected to the ultrasonic transducers 4, 5. The ultrasonic transducers 4, 5 can each work as transmitters 4, 5 for transmitting an ultrasonic signal 7 and as receivers 4, 5 for receiving the ultrasonic signal 7. The measuring tube 3 has the radius R. In addition, the measuring tube 3 has a measuring tube axis at the radius r=0 R.

The ultrasonic transducers 4, 5 are arranged offset on the measuring tube 3 in the flow direction such that the transmitter 4, 5 transmits an ultrasonic signal 7 in the direction of flow or against the direction of flow during operation and that the receiver 4, 5 receives the ultrasonic signal 7 transmitted by the transmitter after at least one reflection on the inner wall of the measuring tube 3, wherein the ultrasonic signal 7 in the illustrated embodiment has three signal components 8, 9, 10.

A first signal component 8 runs on a triangular first measuring path 11 through the measuring tube 3. Thereby, each measuring path section of the first measuring path 11 intersects the region at r=0.5 R. A second signal component 9 runs on a pentagonal second measuring path 12 from the transmitter 4, 5 to the receiver 4, 5. In this case, each measuring path section of the second measuring path 12 intersects the region at r=0.8 R. A third signal component 10 runs on a quadrangular third measuring path 13 from the transmitter 4, 5 to the receiver 4, 5. In this case, each measuring path section of the third measuring path 13 intersects the region at r=0.7 R.

Figure 2:
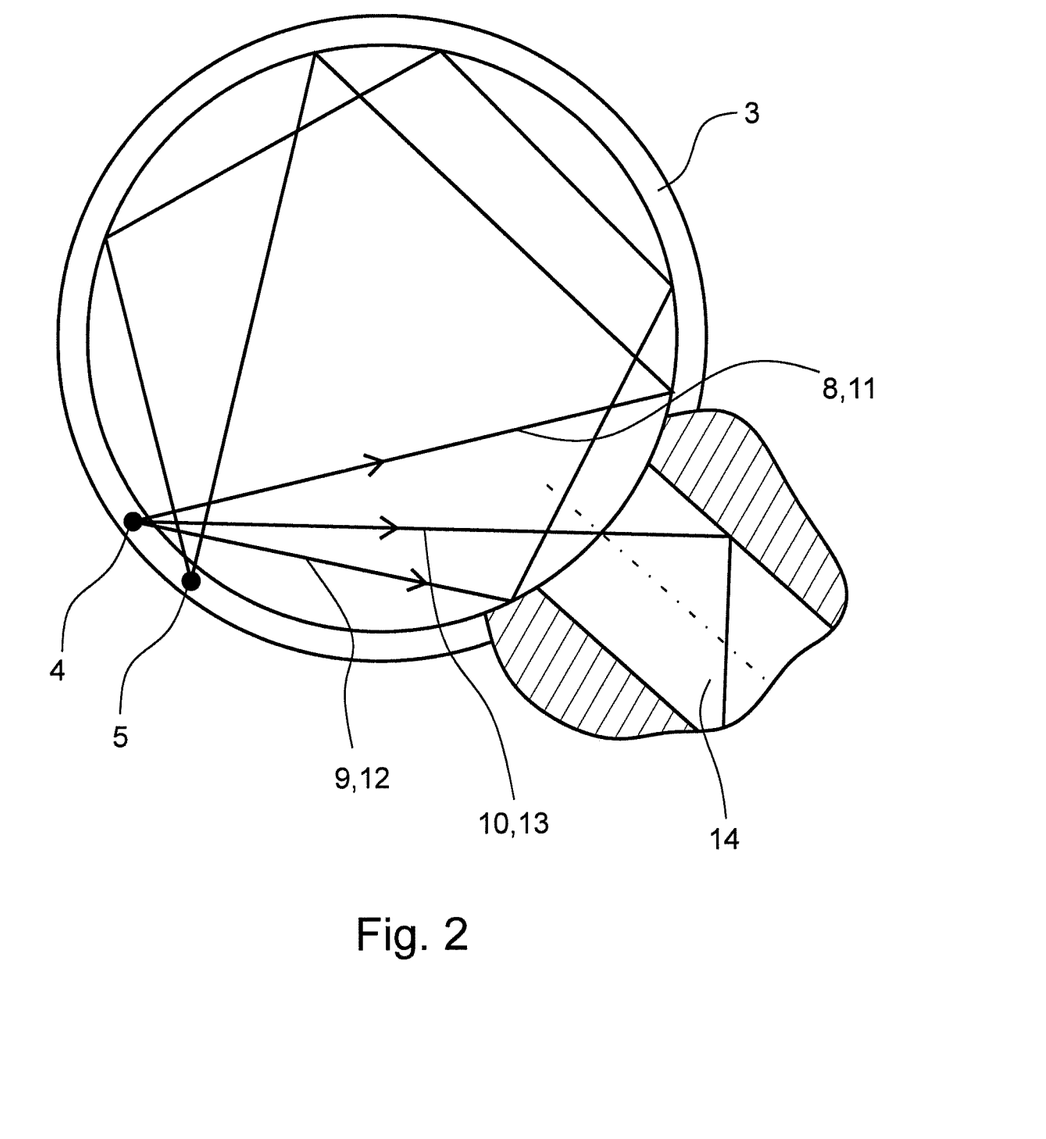
FIG. 2 is a schematic representation of the course of the measuring paths of a second embodiment of the ultrasonic flowmeter according to the invention.

FIG. 2 shows a schematic representation of the course of different measuring paths 11, 12, 13 of a second embodiment of an ultrasonic flowmeter 1. In this case, the measuring tube 3 has a recess 14, into which the third measuring path 13 and, in operation, the third signal component 10 is directed. As a result, the third signal component 10 is not registered by the receiver 5, so that the third parasitic signal component 10 does not influence the determination of the transit time of the remaining signal components 8, 9.

Figure 3:
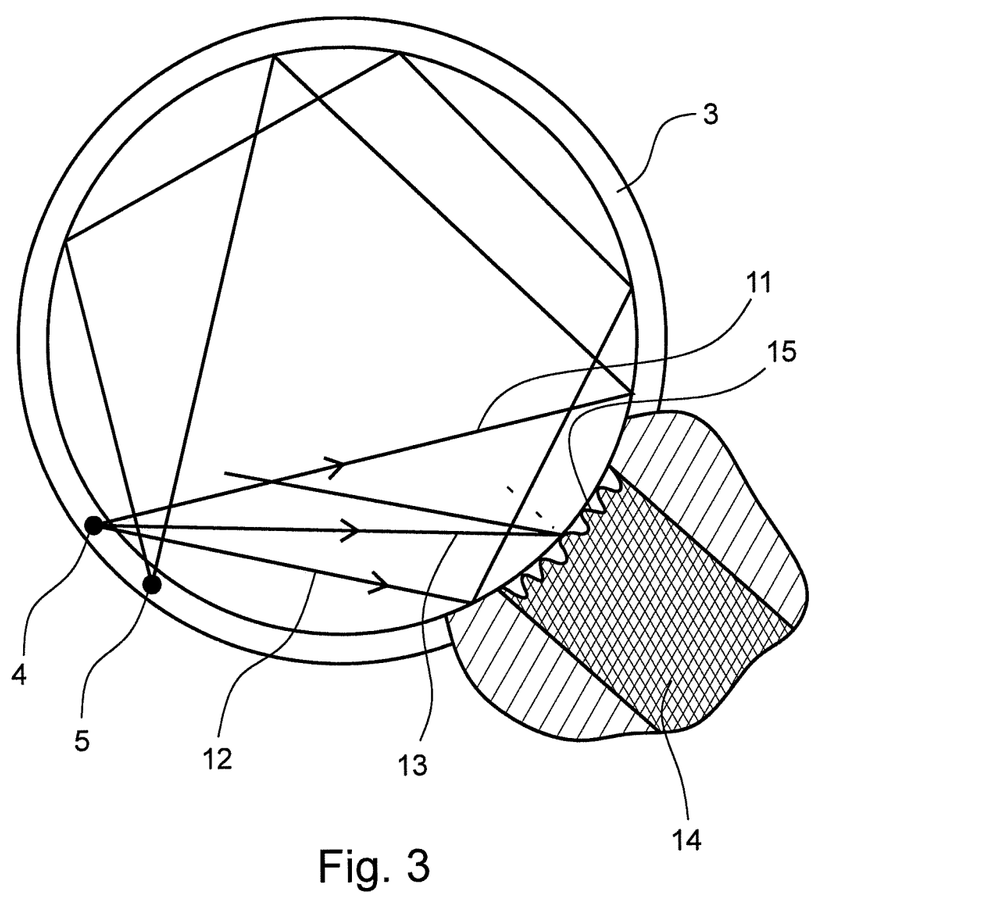
FIG. 3 is a schematic representation of the course of the measuring paths of a third embodiment of the ultrasonic flowmeter according to the invention.

FIG. 3 shows a schematic representation of the course of the measuring paths 11, 12, 13 of a third embodiment of the ultrasonic flowmeter 1, wherein the measuring tube 3 also has a recess 14 for suppressing the third measuring path 13 or the third signal component 10. In contrast to the embodiment illustrated in FIG. 2, the recess 14 is filled with a material that has a structural surface 15. In this case, the surface 15 is structured such that the signal component 13 striking the surface 15 is diffused. The scattering also ensures that the third signal component 10 does not reach the receiver 5 and thus does not influence the determination of the speed.

Figure 4:
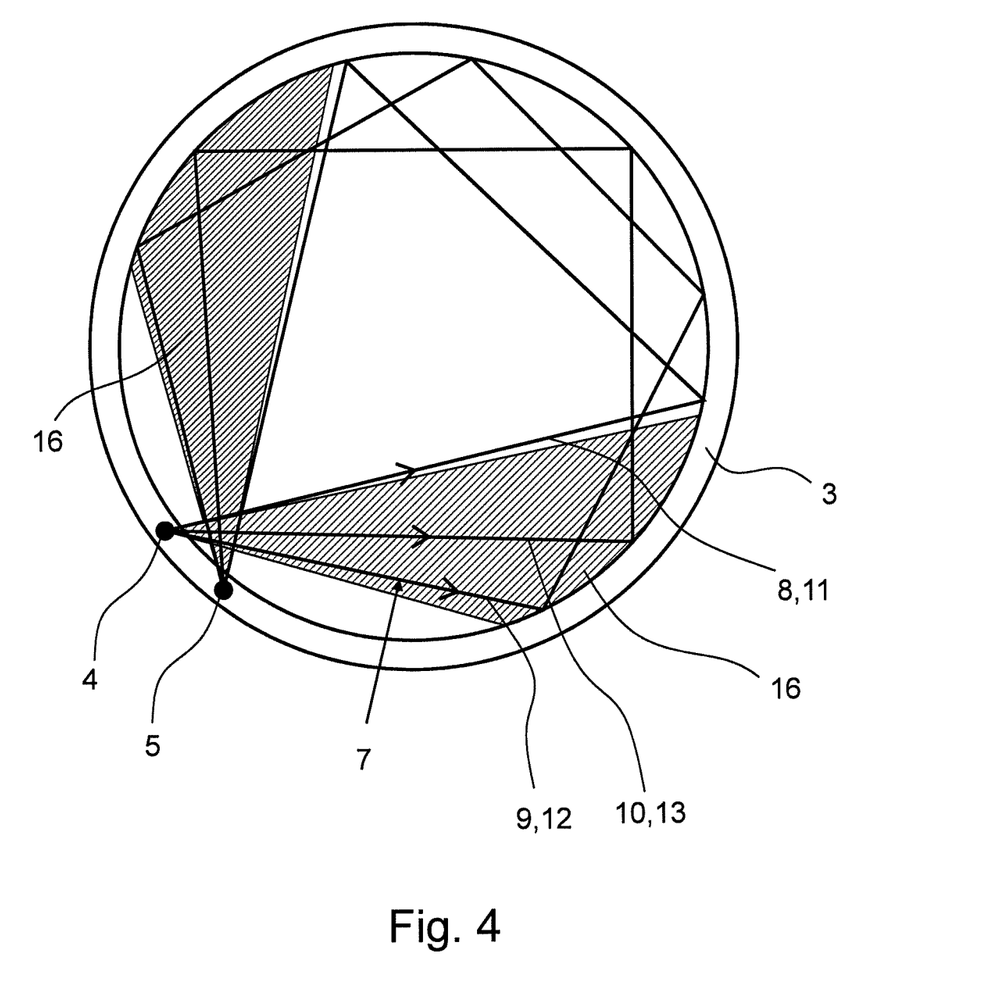
FIG. 4 is a schematic representation of the course of the measuring paths of a fourth embodiment of the ultrasonic flowmeter according to the invention.

FIG. 4 also shows a schematic representation of the profile of the measuring paths 11, 12, 13 of a fourth embodiment of the ultrasonic flowmeter 1 according to the invention. In particular, the ultrasonic cone 16 transmitted by the ultrasonic transducer 4, 5 is illustrated. The boundaries of the ultrasonic cone mark the region in which the sound pressure level has been weakened by 6 dB. In this case, the transmitter 4, 5 is aligned such that the second signal component 9 has more acoustic energy than the first signal component 8, specifically in that the ultrasonic cone 16 is deflected in the direction of the second signal component 9. The loss of acoustic energy that the second signal component 9 suffers due to the higher number of reflections can be compensated with this alignment. In this case, the transmitter 4, 5 is deflected in the direction of the second signal component 9 such that the first signal component 8 and the second signal component 9 have the same acoustic energy at the receiver.

Figure 5:
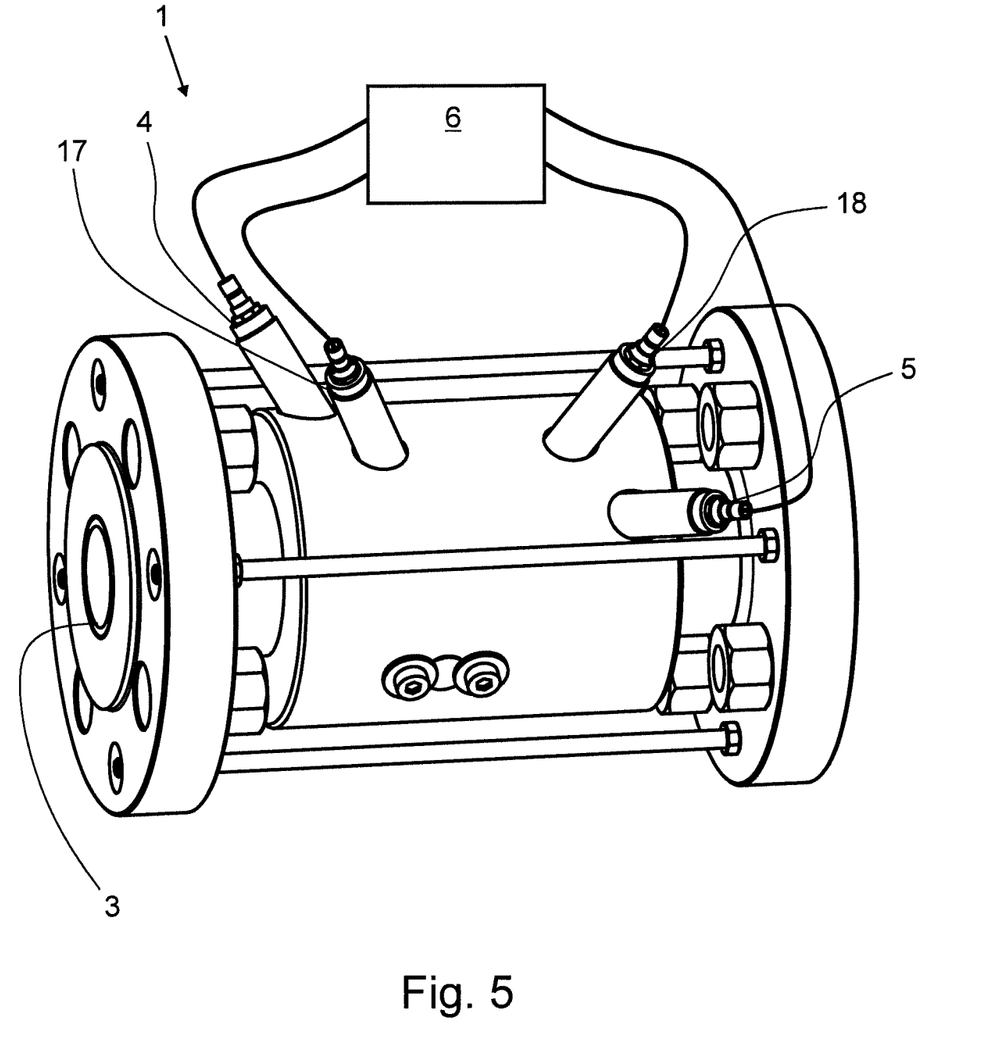
FIG. 5 is a fifth embodiment of an ultrasonic flowmeter.

FIG. 5 is a fifth embodiment of an ultrasonic flowmeter 1. The ultrasonic flowmeter 1 has a first pair of ultrasonic transducers 4, 5 which, viewed in the flow direction, is arranged offset on the measuring tube 3. The ultrasonic transducers 4, 5 are aligned with one another such that a first signal component 8 and a second signal component 9 of the ultrasonic signal 7 transmitted by the transmitter 4, 5 reach the receiver 4, 5 via a first measuring path 11 or via a second measuring path 12. In addition, a third ultrasonic transducer 17 and a fourth ultrasonic transducer 18 are provided, wherein the ultrasonic transducers 17, 18 are each configured as transmitters 17, 18 and as receivers 17, 18. The third and the fourth ultrasonic transducers 17, 18 are arranged offset in the flow direction on the measuring tube 3 such that the measuring path between the third and the fourth ultrasonic transducer 17, 18, intersects the measuring tube axis at r=0 R. In addition, all ultrasonic transducers 4, 5, 17, 18 are arranged on the same side of the measuring tube 3, whereby the external electrical connection (wiring) to the ultrasonic transducers 4, 5, 17, 18 is particularly simple.

In addition, a recess 14 is provided, in which the parasitic signal component 13 is directed, so that the signal component 13 causes no errors in the determination of the transit time of the signal components 8 and 9 at the receiver 4, 5.

The illustrated embodiment has the advantage that, in order to determine the flow rate of the medium flowing through the measuring tube 3 during operation, the flow profile of the medium can be measured particularly finely due to the high number of measuring paths 11, 13, whereby the error in determining the flow rate is particularly small. In addition, the implementation of the measuring paths 11, 13 is achieved in comparison with the arrangements known from the prior art with a significantly reduced number of ultrasonic transducers 4, 5, 17, 18, whereby the illustrated ultrasonic flowmeter 1 is particularly cost-effective.

Figure 6:
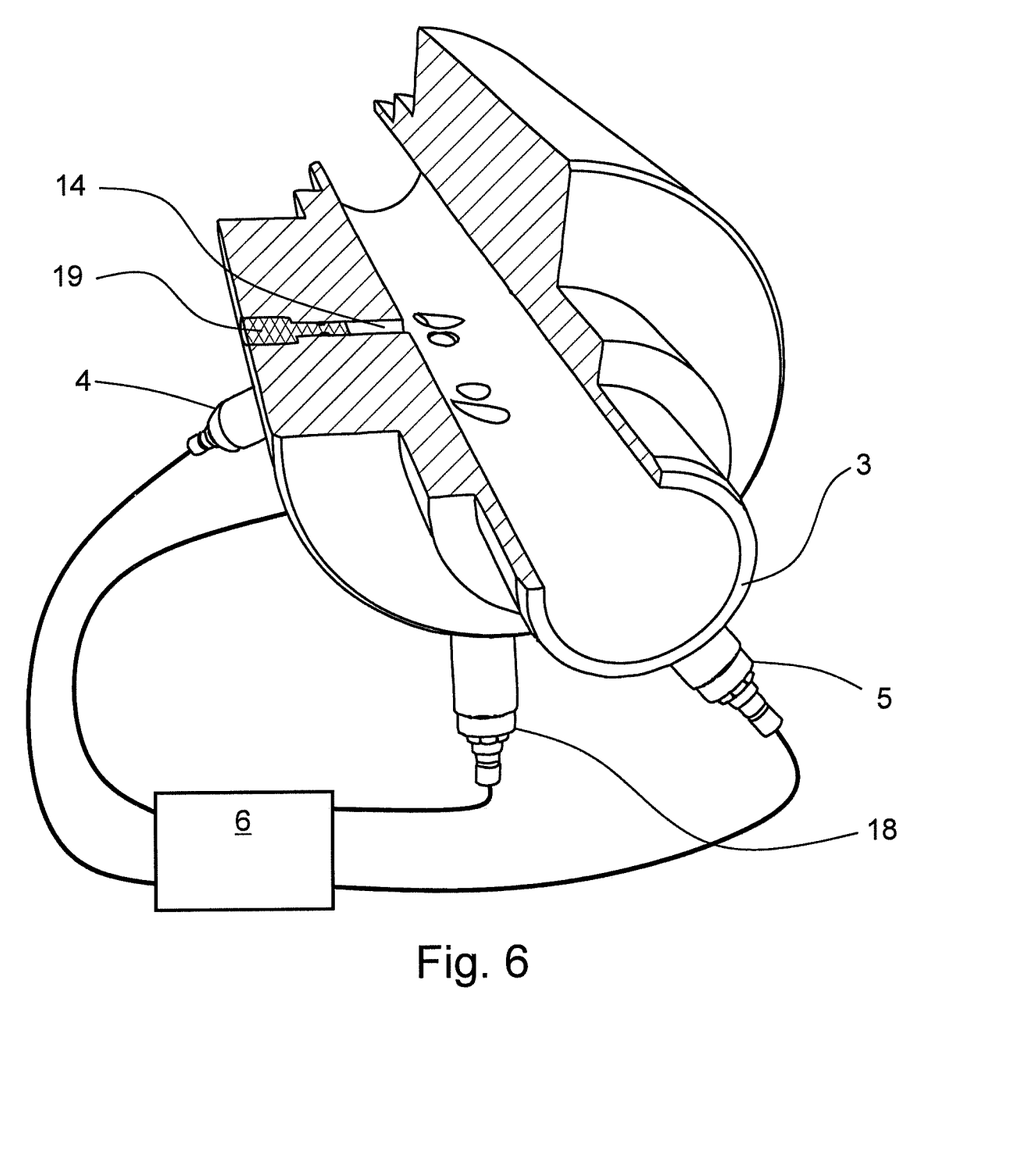
FIG. 6 is the fifth embodiment of the ultrasonic flowmeter in sectional view.

FIG. 6 shows a sectional view of the fifth embodiment of an ultrasonic flowmeter 1 shown in FIG. 5. The illustration shows the measuring tube 3 and the arrangement of the ultrasonic transducers 4, 5, 17, 18. The measuring tube 3 has a recess 14 into which, during operation, the signal component 10 to be suppressed is directed. The recess 14 is filled with a sealing material 19, whereby leakage can be avoided.

Figure 7:
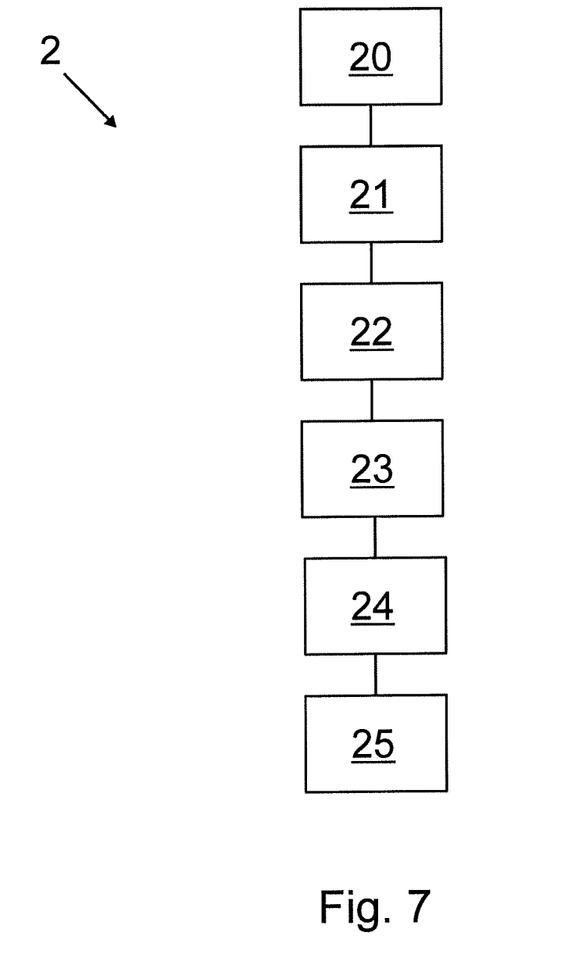
FIG. 7 is a first embodiment of a method according to the invention.

FIG. 7 shows a first embodiment of a method 2 according to the invention for measuring the flow of a medium flowing through a measuring tube 3 by means of an ultrasonic flowmeter 1, wherein the ultrasonic flowmeter 1 is designed according to the arrangement shown in FIG. 2.

In a first step 20, the ultrasonic transducer 4, 5 operating as a transmitter transmits an ultrasonic signal 7 in the flow direction into the measuring tube 3, wherein the ultrasonic signal 7 has a first signal component 8, a second signal component 9 and a third parasitic signal component 10. The parasitic signal component 10 is directed into the recess 14 to be suppressed.

The first signal component 8 reaches the receiver 4, 5 via a first measuring path 10, and the second signal component 9 reaches the receiver 4, 5 via a second measuring path 11.

The control and evaluation unit 6 determines the transit time of the first signal component 8 and the transit time of the second signal component 9 in a next step 21.

Subsequently, the transmitter 4, 5, which was previously active as a receiver 4, 5, transmits an ultrasonic signal 7 against the flow direction into the measuring tube 3.

The receiver 4, 5 receives the ultrasonic signal 7 and forwards it to the control and evaluation unit 6.

The control and evaluation unit 6 determines the transit times of the first and second signal components 8, 9 in a next step 23.

Subsequently, the control and evaluation unit 6 determines the speed of the medium 24 from the transit time difference of the signal components traveling back and forth, and the control and evaluation unit 6 determines the flow rate of the medium from the speed of the medium in a next step 25.

The method 2 has the advantage that two measuring paths 11, 12 can be implemented for measuring the flow profile of the medium by means of a single pair of ultrasonic transducers, so that, on the one hand, the flow profile can be scanned particularly finely and, on the other hand, the method is particularly inexpensive due to the reduced number of ultrasonic transducers 4, 5.

Figure 8:
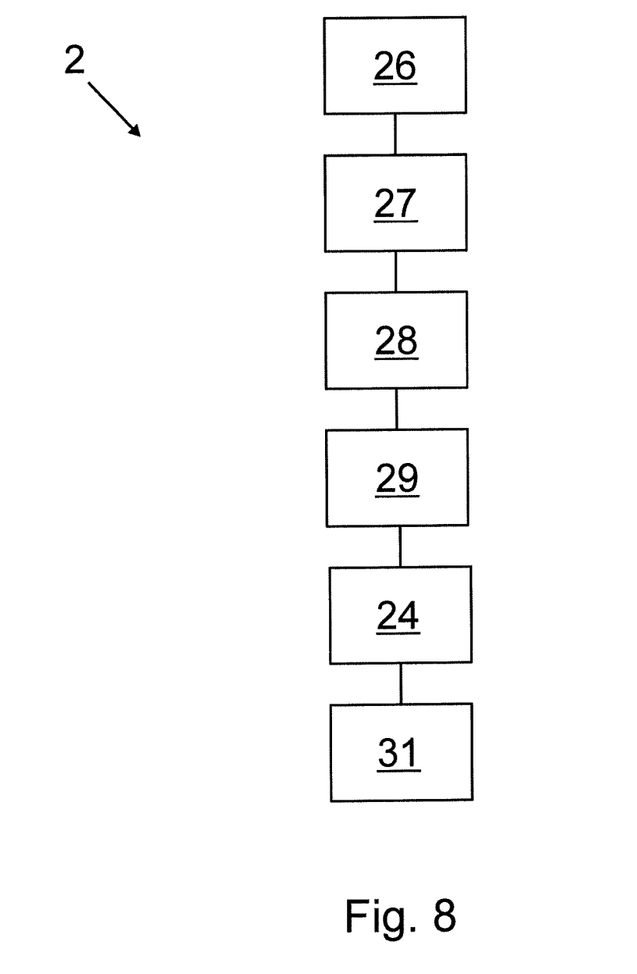
FIG. 8 is a second embodiment of a method according to the invention.

FIG. 8 shows a second embodiment of a method 2 according to the invention, wherein the ultrasonic flowmeter 1 is designed according to the embodiment illustrated in FIG. 5. Accordingly, the ultrasonic flowmeter 1 has four ultrasonic transducers 4, 5, 17, 18, wherein the first ultrasonic transducer pair 4, 5 measures the edge region of the flow profile and wherein the second ultrasonic transducer pair 17, 18 measures the central region of the flow profile by means of a second ultrasonic signal 7a.

In a first step 26, the ultrasonic transducer 4, 5 operating as a transmitter transmits a first ultrasonic signal 7 in the flow direction into the measuring tube 3, wherein the ultrasonic signal 7 has a first signal component 8, a second signal component 9 and a third parasitic signal component 10. In order to suppress the parasitic signal component, it is directed into the recess 14. At the same time, the ultrasonic transducer 17, 18, which operates as a transmitter, transmits a second ultrasonic signal 7a into the measuring tube.

The signal components 8 and 9 of the ultrasonic signal 7 are received by the ultrasonic transducer 4, 5 operating as a receiver and the ultrasonic signal 7a is received by the ultrasonic transducer 17, 18 operating as a receiver.

In a next step 27, the control and evaluation unit 6 determines the transit times of the first signal component 8 and of the second signal component 9 and of the ultrasonic signal 7a.

Subsequently, the transmitters 4, 5, 17, 18, which were previously active as receivers 4, 5, 17, 18, transmit an ultrasonic signal 7 or 7a against the flow direction into the measuring tube 3.

The receivers 4, 5, 17, 18 receive the ultrasonic signal 7 or 7a and forward it to the control and evaluation unit 6, here indirectly as an electrical measurement signal.

In a next step 29, the control and evaluation unit 6 determines the transit times of the first and the second signal component 8, 9 and the transit time of the ultrasonic signal 7a.

Subsequently, the control and evaluation unit 6 determines the speed of the medium 30 from the transit time difference of the signal portions 8, 9 or the ultrasonic signal 7a and the control and evaluation unit 6 determines the flow rate of the medium in a next step 31 from the speed of the medium.

The method 2 shown in FIG. 8 has the advantage that by means of two ultrasonic transducer pairs 4, 5 and 17, 18, the flow profile of the medium can be scanned particularly finely both in the middle region and in the edge region, whereby the error in the determination of the flow rate of the medium is particularly small. In addition, the method is particularly cost-effective due to the reduced number of ultrasonic transducers.

What is claimed is:

1. An ultrasonic flowmeter for measuring the flow of a medium flowing through a measuring tube, comprising:
   a measuring tube,
   at least two ultrasonic transducers connected to the measuring tube and
   at least one control and evaluation unit,
   wherein the measuring tube has an inner wall,
   wherein the ultrasonic transducers comprise at least one transmitter for transmitting an ultrasonic signal and at least one receiver for receiving the ultrasonic signal,
   wherein the ultrasonic transducers are arranged offset in a direction of flow through the measuring tube in a manner enabling the respective transmitter to transmit an ultrasonic signal in or against the direction of flow during operation, the ultrasonic signal having a first signal component and at least a second signal component,
   wherein the receiver is positioned to receive the ultrasonic signal transmitted by the transmitter after at least one reflection on the inner wall of the measuring tube,
   wherein the ultrasonic transducers are aligned with one another such that the first signal component of the ultrasonic signal will reach the receiver via a first measuring path from the transmitter to the receiver, and the second signal component of the ultrasonic signal will reach the receiver via a second measuring path from the transmitter to the receiver,
   wherein the first measuring path and the second measuring path have a different number of reflections on the inner wall of the measuring tube and
   wherein the first signal component and the second signal component are distinguishable by different transit times at the receiver, and
   wherein the control and evaluation unit is adapted for determining speed and flow rate of the medium using the transit time of the first signal component and the transit time of the second signal component.

2. The ultrasonic flowmeter according to claim 1, wherein the measuring tube has an inner cross-section with a radius R and wherein the first and the second ultrasonic transducers are arranged and aligned such that the first measuring path and the, second measuring path are arranged in an edge region of the inner cross section at a radius r which is more than or equal to 0.5 R.

3. The ultrasonic flowmeter according to claim 1, wherein the ultrasonic transducers are aligned such that the first measuring path has at least two reflections on the inner wall of the measuring tube and that the second measuring path has at least three reflections on the inner wall.

4. The ultrasonic flowmeter according to claim 1, further comprising at least one means for suppressing at least one further signal component, which reaches the receiver via a further stable measuring path.

5. The ultrasonic flowmeter according to claim 4, wherein the means for suppressing is configured as at least one recess of the inner wall of the measuring tube.

6. The ultrasonic flowmeter according to claim 5, wherein the recess is filled with a material that absorbs ultrasonic signals.

7. The ultrasonic flowmeter according to claim 5, wherein the recess is filled with a material having a structural surface for scattering the signal component to be suppressed.

8. The ultrasonic flowmeter according to claim 1, wherein the transmitter is aligned to direct an ultrasonic signal in a direction of a signal component which reaches the receiver via the measuring path with a highest number of reflections.

9. The Ultrasonic flowmeter according to claim 8, wherein the transmitter is aligned such that at least a first signal component and a second signal component have substantially the same acoustic energy at the receiver.

10. The ultrasonic flowmeter according to claim 2, wherein said at least two ultrasonic transducers comprise four ultrasonic transducers, wherein a third and a fourth of the ultrasonic transducers are arranged on the measuring tube offset in the flow direction such that the measuring path between the third and the fourth ultrasonic transducer intersects the measuring tube axis at r=0 R.

11. The ultrasonic flowmeter according to claim 1, wherein all of the ultrasonic transducers are arranged on the same side of the measuring tube.

12. A method for measuring the flow rate of a medium flowing through a measuring tube by means of an ultrasonic flowmeter that has at least two ultrasonic transducers and at least one control and evaluation unit, wherein the measuring tube has an inner wall, wherein the ultrasonic transducers comprise at least one transmitter for transmitting an ultrasonic signal and a receiver for receiving the ultrasonic signal, wherein the ultrasonic transducers are arranged on the measuring tube offset in the direction of flow such that the respective transmitter transmits an ultrasonic signal in or against the flow direction, the method comprising:
 directing a flow of a medium through the measuring tube,
 transmitting a first signal component of the ultrasonic signal to the receiver via a first measuring path from the transmitter,
 transmitting a second signal component of the ultrasonic signal to the receiver via a second measuring path from the transmitter,
 causing the first measuring path and the second measuring path to produce a different number of reflections on the inner wall of the measuring tube,
 distinguishing the first signal component from the second signal component by different transit times to the receiver and
 using the control and evaluation unit to determine speed and flow rate of the medium using the transit time of the first signal component and the transit time of the second signal component.

13. The method according to claim 12, wherein at least one further signal component of the ultrasonic signal is directed toward the receiver via a further stable measuring path and wherein the at least one further signal component of the ultrasonic signal is suppressed by a means for suppression.

14. The method according to claim 12, wherein at least a third and a fourth ultrasonic transducer, at least one of which is a second transmitter and one of which is a second receiver are arranged on the measuring tube offset in the flow direction such that a measuring path between the third and the fourth ultrasonic transducers intersects a measuring tube axis, the second transmitter transmits a further ultrasonic signal that is received by the second receiver and wherein the control and evaluation unit takes the transit time of the further ultrasonic signal into account in determining the speed of the medium.

* * * * *